Figure 1:
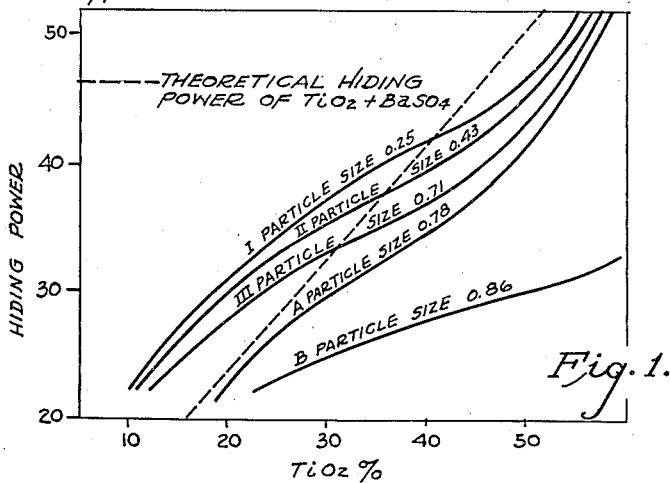

June 30, 1936.  J. E. BOOGE  2,046,054

BLENDED PIGMENT

Filed Oct. 30, 1934

INVENTOR.
JAMES E. BOOGE.
BY
George Lee
ATTORNEY.

Patented June 30, 1936

2,046,054

UNITED STATES PATENT OFFICE 2,046,054

BLENDED PIGMENT

James E. Booge, Newark, N. J., assignor, by mesne assignments, to E. I. du Pont de Nemours and Company, a corporation of Delaware Application October 30, 1934, Serial No. 750,645

5 Claims. (Cl. 134—58)

The present invention relates to pigments consisting of $TiO_2$ of pigment quality mechanically mixed with an alkaline earth metal sulfate and is particularly distinguished by the characteristics of the components, $TiO_2$ and alkaline earth metal sulfates. In the blended pigments of my invention the alkaline earth metal sulfate acts as a reinforcing pigment in contradistinction to prior art pigment mixtures in which the alkaline earth metal sulfate acts merely as an inert diluent.

The invention is applicable for calcium base, strontium base as well as barium base pigments, though at the present time strontium sulfate, due to its cost is not available for the commercial production and use in pigments of this type. My description of my novel pigments and methods of making them will therefore be limited to calcium and barium base pigments. It will be understood that the expression alkaline earth metal as used herein excludes magnesium which is sometimes but loosely referred to as an alkaline earth metal. This exclusion is quite logical inasmuch as this invention deals with substantially water insoluble sulfate extenders such as calcium, strontium, or barium sulfate, and magnesium sulfate is freely soluble in water.

It has heretofore been axiomatic in the paint and pigment arts that only such titanium dioxide-alkaline earth metal sulfate pigments are of value in which the particles of titanium dioxide are precipitated on and coalesced with an alkaline earth metal sulfate, and that the valuable properties of such coalesced pigments are not reproducible by mere mechanical mixing or blending of the components.

This coalescence of the components of the extended pigments has been produced by precipitation of one component in the presence of and on the surface of the other component followed by cocalcination. The expressions "coalescence" and "coalesced" as used herein are intended to indicate that the pigments have been produced by such methods.

L. E. Barton, a pioneer in this art of coalesced pigments, states as follows: (U. S. P. 1,155,462, Oct. 5, 1915, page 1, lines 23 to 39):

"The increased hiding power thus imparted to oil paint by my novel composite titanic oxide pigments seems attributable only to my novel methods of producing them which result in an extremely, if not unprecedentedly, minute subdivision of the titanic constituent and its peculiar attachment to, or coalescence with, suspended minute particles of a sulphate base, "or extender", usually preponderating, but which has, however, by itself in oil no hiding power; and I am satisfied that equally good results are unobtainable thru any mere mechanical mixing of the same or even greater proportions of any titanic material with similar bases otherwise produced."

Similarly, a whole series of patents to Barton features the same idea including Numbers 1,205,144, 1,218,161, 1,234,260, 1,236,655, 1,240,405, 1,288,473, 1,409,648. These cover the period of 1917 to 1922.

Similarly, Buckman in U. S. P. 1,402,256, states in claim 7

"As a new article the hereinbefore described uncalcined composite product, distinguished by consisting essentially of barium sulphate particles and adhering thereto particles of a titanium complex hydrolytically precipitated thereon at temperatures substantially above 100° C. and under pressure substantially above atmosphere."

Buckman in U. S. P. 1,410,056, makes similar statements.

A later patent to Barton and Ryan U. S. P. 1,680,316, features the coalescence of the $TiO_2$ and the extender.

This teaching is not confined to the patent art. For example, Mr. Noel Heaton at a meeting of the Royal Society of Art, May 3, 1922, states as follows: (Reference the Chemical Trade Journal, 1922, page 565)

"It was found that by precipitating the titanium together with $BaSO_4$ a physical combination of the two was formed which had better pigmentary properties than the pure oxide.

In practice it was found preferable to form the $BaSO_4$ first and add it in the state of pulp to the solution and precipitate the titanium on it by the process of agitation just described, page 566.

The extraordinary point was that when the combined precipitate of titanium oxide and barium sulphate was calcined in this way, the opacity of the composite product obtained was far above the mean of that of the two constituents. The theory put forth by Washburn to account for this was that on precipitation the titanium oxide formed a coating on the surface of the particles of $BaSO_4$."

Similarly, Mr. H. A. Gardner in the American Paint Journal, June 23, 1930, number 24, states as follows:

"The composite pigments are made up of titanium oxide coalesced with an inert white extender pigment. In the manufacturing process hydrated titanium oxide is precipitated upon the surface of the particles of the white extender. A later calcination step changes the hydrated titanium oxide to the oxide ($TiO_2$) and at the same time causes a cementing of the components."

My own experience has in general confirmed the fact that ordinary barium and calcium sulfates as commercially available or as made by standard processes, produce, when blended with $TiO_2$, pigments which are unsatisfactory. As a matter of fact mixtures of ordinary calcium or barium sulfate with $TiO_2$ are inferior in color, tinting strength and hiding power to corresponding amounts of $TiO_2$, whereas compositions in which the same amounts of $TiO_2$ are coalesced with the same amount of alkaline earth metal sulfate are equal or slightly superior to the same amount of straight $TiO_2$, and as far as I am aware all composite $TiO_2$ alkaline earth metal sulfate pigments commercially available heretofore have been of the coalesced type.

I have found that unexpectedly one obtains pigments of a color, strength and/or hiding power approaching that of or superior to those of the corresponding amounts of straight $TiO_2$ if one adjusts the pigmenting properties of the $TiO_2$ component and those of the alkaline earth metal sulfate component to certain values as will be described below.

The pigments obtained in this manner are, though physically different, equivalent or even superior in pigment quality to the best coalesced pigments of the same chemical composition in respect to $TiO_2$ and alkaline earth metal sulfate.

It has been necessary in order to obtain the desired alkaline earth metal sulfates to devise new processes and treatments or to modify existing processes of making alkaline earth metal sulfates as will be explained further on.

It should be understood that the alkaline earth metal sulfates as used in my invention should exist in the form of individual particles not attached to, or coprecipitated with, or coalesced with any other pigmenting materials, and that my claims should be interpreted to exclude from the blends any such coprecipitated or coalesced alkaline earth metal sulfates.

For a better understanding of the characteristics of the $TiO_2$ and alkaline earth metal sulfates required to produce the desired extended pigments of my invention it will be necessary to explain the various terms used herein and the methods of testing employed:

Color

Color is the apparent brightness and tint of the pigment in an oil paste as measured relative to a standard similarly prepared and is expressed in units on an arbitrary scale.

The pastes are prepared by mulling the pigment with acid refined linseed oil of acid number 12.5 to form a thick paste. The sample to be tested and the standard are placed beside each other on a colorless microscope slide 2″x 3″ in daubs about 1½″x 1″. The daubs should be in sharp contact without air bubbles in the contact line and should be sufficiently thick to cut off all transmitted light. The pastes are then graded under north sky light for difference in appearance. The minimum perceptible difference in brightness is called one point of color. The sample is graded in full points from the standard. Differences in tint are important. In the case of white pigments a yellowish cast of the sample is penalized in the grading to the extent of one or more points as it is barely perceptible or clearly evident. On the other hand a bluish cast relative to the standard is desirable and consequently modifies the brightness grading upward. This procedure is essentially the one described by J. E. Booge and H. E. Eastlack in the Paint, Oil and Chemical Review, April 9, 1924.

Pigments suitable for use in high grade white paints should rate 12 or higher on the arbitrary scale of the above color test.

Reflectance

Reflectance is the ratio of light reflection from the sample to be tested to light reflected from standard fumed MgO under conditions of equal and essentially diffuse illumination and as viewed from a direction normal to the surface of the sample. Values are determined and reported corresponding to noon sunlight illumination and to the spectral region centering at 459 millimicrons, in the blue region.

The values of reflectance as used herein were measured by use of the Priest reflectometer which is essentially that described as the Priest-Lange reflectometer in the American Enameler for August 1933, pp. 3–4.

The samples and standard are illuminated diffusely and viewed at right angles to their respective surfaces. The illumination is approximately completely diffused except for the viewing hole, 4 cm. in diameter, located about 15 cm. from the sample. The gradings are obtained by illuminating the sphere wall, from which the sample is illuminated, with gas filled incandescent lamps and viewing sample and standard through a piece of Corning daylight glass (melt of 1925) of suitable density for the noon sunlight grading, or a suitable blue filter for the blue region grading.

The brightness of each sample illuminated in this way was determined relative to that of magnesium oxide by a Martens photometer according to standard procedure.

The samples were prepared for test by pressing the dry pigment into a trough, using fine ground plate glass to form a flat-matte surface.

Hiding power

Hiding power is defined as the area covered, in $cm^2$, by one gram of pigment as contained in a paste of the stated oil content when spread at a thickness just sufficient to obliterate, visually, the line of demarcation between the film as spread over a black surface at the finite and critical film thickness and at infinite thickness.

The instrument used for this determination is the well type cryptometer. The instrument and methods of using it are described by A. H. Pfund, Journ. Franklin Institute, Nov. 1919, p. 676 and in Gardner's "Physical and Chemical Examination of Paints, Varnishes, Lacquers and Colors", 1933 edition, pp. 18–21 and 38–39.

The observations were made in a special shield with a 50w. lamp.

Pastes were prepared by mulling the pigment and oil for 5 minutes with a 15 lb. weighted muller. The oil used was acid refined linseed oil of 12.5 acid number for $BaSO_4$ blends; for calcium sulfate blends a mixture was used consisting of 50% of this oil and 50% of a kettle bodied linseed oil of 13.4 acid number and Gardner-Holdt body Z. In case of the $BaSO_4$ blends the oil portion of the pastes represented 68.5% by volume of the total. The wide range of the oil absorption of the calcium sulfate blends made the use of equal oil contents impractical and the use of the simple acid refined linseed oil impossible. Pastes were therefore prepared with the above oil mixture to equal consistencies as judged by the spatula.

The pastes used for $TiO_2$ were prepared in the same way and contained 68.5% by volume of acid refined oil for comparisons with the titanic oxide-barium sulfate pigment. For comparisons with titanic oxide-calcium sulfate pigments, the pastes were made to equal consistency using the mixture of kettled bodied and acid refined linseed oils described above.

Hiding power is calculated from the wedge reading of the Pfund cryptometer for the critical hiding thickness as follows:

$$\text{Hiding power} = \frac{100}{K \times L \times S \times P}$$

in which $K$ = wedge constant (0.000743 for wedge used)
$L$ = wedge reading
$S$ = specific gravity of paste
$P$ = per cent pigment in paste

*Tinting strength*

Tinting strength is a measure of the effectiveness of a white pigment in covering up the tint of a colored pigment mixed with it. The property is relative in nature and results are obtained in comparison with another pigment used as standard. These results depend on the standard for magnitude but are independent of the standard for relative order.

Pastes are prepared by mulling together the white pigment, ultramarine blue, and acid refined linseed oil of 12.5 acid number.

The proportions used were 3.0 grams of white pigment, 0.3 grams of ultramarine blue and 1.0 cc. of oil for barium sulfate blends. The proportions of pigment and blue were the same for the calcium sulfate blends but due to the wide range of oil absorptions larger quantities of oil were required for the latter. To determine the tinting strength of the $TiO_2$ content of the blended pigments, the same amount of blue and oil were mulled with the corresponding amount of pigment $TiO_2$. Mulling was for 3 minutes with a 15 lb. weighted muller.

Standards are prepared in the same manner except for the amount of blue which is increased or decreased proportionally as it is desired to prepare standards for lower or higher strength. The standard may be any white pigment but was in all cases a pigment similar in strength and chemical composition to the pigment being tested, i. e. a $BaSO_4$—$TiO_2$ combination for evaluating barium sulfate blends and a $CaSO_4$—$TiO_2$ combination for evaluating calcium sulfate blends.

The sample paste is graded through a glass microscope slide between standards of higher and lower strength (that is less or more deeply tinted) and not more than 5% apart in strength.

The proportion of blue used in the standard paste to give any desired strength is inversely proportional to that strength. Thus one standard is called arbitrarily 210 which corresponds to 0.3 grams of blue in the paste. The blue required to give 190 strength is $$\frac{210}{190} \times 0.3$$

The above method is similar to that described by J. E. Booge and H. E. Eastlack, in the Paint, Oil and Chemical Review, April 16, 1924.

*Oil absorption*

Oil absorption is the amount of oil, in grams, required to wet 100 grams of pigment.

The method of testing is described in Gardner's book cited above under Hiding power, on pages 475–7.

A 5 gram sample is used. Acid refined linseed oil of acid number 12.5 is added slowly from a burette and worked into the pigment with a spatula on a smooth glass plate. The addition of oil is continued a drop or two at a time until the pigment can be collected in one coherent mass adhering to the spatula but not wetting the glass. The amount of oil used to wet the pigment is read from the burette.

*Particle size*

Particle size as used herein refers to the "frequency particle size average" which may be described as the number weighted average diameter.

The method of measurement was essentially that described by Henry Green, Paint, Oil and Chemical Review, volume 88, #10, page 10, March 10, 1927.

Pigment dispersions were prepared in dammar gum for $TiO_2$ and in a mixture of 66% Canada balsam, 20% Michler's ketone, and 14% asphaltum for the alkaline earth metal sulfates and for the titanium dioxide-alkaline earth metal sulfate pigments. The preparations were photographed at 1500 diameters (except for very coarse material) using transmitted ultraviolet light of 366 millimicrons from a mercury arc.

The initial photographs were enlarged 3⅓ times to a total magnification of 5000 diameters. Particles were classified in ½ mm. intervals (corresponding to 0.1 micron actual size). Each determination was based upon a count of at least 750 particles classified into the above size classes measuring in each case the horizontal diameter. The frequency particle size distribution thus obtained was then converted to a frequency per cent distribution yielding the percentage of particles in each class.

Frequency particle size average is defined by the expression $$F.P.S.A. = \frac{n_1 d_1 + n_2 d_2 + n_3 d_3 + \ldots + n_m d_m}{n_1 + n_2 + n_3 + \ldots + n_m}$$

Where $n_1$ is the number of particles in a size class the average diameter of which is $d_1$, $n_2$ is the number of particles in a size class the average diameter of which is $d_2$, and so on until the largest size class counted ($n_m$, $d_m$) is reached.

The optical system is incapable of resolving material below approximately $0.2\mu$ in the case of the alkaline earth metal sulfates and below a somewhat smaller (about $0.15\mu$) limiting size in the case of $TiO_2$. Particles of sizes significantly below these limiting sizes are not shown by this method of determining particle sizes.

It would appear unnecessary for the purposes of the present invention to give consideration to particles of a fineness below about 0.2μ as the determining factor in my invention is the absence of substantial amounts of particles above certain limits.

Having explained the terms to be used herein I can now proceed with a detailed description of my invention.

This invention consists in selecting a titanium dioxide and an alkaline earth metal sulfate both of specific particle size and other characteristics and mechanically mixing, or blending them, whereby I obtain a blended pigment in which the individual particles of $TiO_2$ and sulfate exist independently side by side. These novel pigments are further characterized as being equivalent in pigment properties, namely hiding power and/or tinting strength, and reflectance, brightness, etc. to coalesced pigments of substantially the same chemical composition. These blends are also, within certain limits of composition, superior in pigment properties to the corresponding amounts of the $TiO_2$ contained therein.

*Description of the properties of the components*

The $TiO_2$ needed in my invention must have a frequency particle size average of not more than 0.5 microns and at least 90% of said particles of said $TiO_2$ must be not greater than 1.5 microns; the $TiO_2$ should also have a hiding power of at least 90 cm²/gm and preferably a reflectance of at least 0.94. The $TiO_2$ must also be of the type such as used for pigment purposes, i. e. it must be free from colored impurities, it should be of crystalline nature, such as is developed by heat treatments of precipitated hydrous titanium oxide and to indicate the generally well known properties of a $TiO_2$ available for pigmenting purposes I shall use the expression "pigment $TiO_2$" to distinguish from the more or less colloidal, or amorphous, and impure products such as would not have the required hiding power and strength.

It is to be understood that the term pigment $TiO_2$ as used herein is not limited to a chemically pure compound corresponding exactly to the chemical formula $TiO_2$, as there may be present minor amounts of impurities which do not seriously affect pigmenting properties.

The alkaline earth metal sulfate needed in my invention must have a frequency particle size average of not more than 0.75 microns and at least 90% of said particles of alkaline earth metal sulfate must not be greater than 1.5 microns. The alkaline earth metal sulfates have such low hiding power and tinting strength that these characteristics are practically immaterial in respect to the pigment properties of the blends made therefrom. The alkaline earth metal sulfates should, however, have a reflectance in the blue region of at least 0.94, preferably at least 0.975.

*Description of the blended pigments*

I have found that by mechanically mixing or blending $TiO_2$ and alkaline earth metal sulfates of the above characteristics, I obtain pigments which in hiding power and tinting strength are equivalent or even superior to coalesce pigments of the same chemical composition.

It is of course understood that coalescence processes may produce pigments of various qualities. I, however, have made all comparisons of my blended pigments with the best coalesced pigments I know of, namely, such products which have been made by processes combining the disclosure of U. S. P. No. 1,409,648 to Barton and U. S. P. No. 1,906,730 to Washburn and Aagaard with the processes disclosed in U. S. P. Nos. 1,795,467, 1,851,487, and 1,758,528. It shall also be understood when I speak of and claim blended pigments which in pigment properties are at least equal to (that means equal to or better than) coalesced pigments, I always refer to the comparisons made with such coalesced pigments of maximum properties.

In tinting strength my novel pigments as well as the coalesced pigments are substantially equal or slightly superior to the corresponding amounts of straight $TiO_2$ of the same characteristics.

This is illustrated by the following table representing measurements of typical pigments.

| Per Cent $TiO_2$ | Straight $TiO_2$ | Barium base pigment | | Calcium base pigment | |
|---|---|---|---|---|---|
| | | Coalesced | Blended | Coalesced | Blended |
| 16.8 | 100 | | | | |
| 17.1 | 103 | 114 | 126 | | 132 |
| 19.6 | 117 | | 149 | | |
| 22.9 | 140 | 164 | | | |
| 24.1 | 146 | | 166 | | |
| 24.7 | 150 | | 174 | | |
| 25.0 | 152 | | | | |
| 25.5 | 155 | | | | 180 |
| 25.8 | 157 | 165 | 174 | | |
| 27.4 | 167 | 164 | | | |
| 28.1 | 170 | | | 194 | |
| 29.6 | 177 | | | 193 | 201 |
| 30.5 | 183 | | | 199 | 211 |
| 33.0 | 198 | | | 207 | 215 |
| 80.1 | | | | 207 | 220 |
| | | | | 354 | 379 |

The situation in respect to hiding power is somewhat different. I found that hiding powers of coalesced pigments run parallel to the hiding power of straight $TiO_2$ up to about 30 to 35% $TiO_2$ content of the pigments and for pigments containing more $TiO_2$ the hiding power does not increase at the same rate as that corresponding to the same amounts of $TiO_2$.

In the case of blended pigments the hiding power of blends made within the limits of my invention is, in pigments containing up to from 20 to 40% $TiO_2$, substantially greater than that of coalesced pigments and straight $TiO_2$, but it then also falls off at higher $TiO_2$ percentages.

This is particularly noticeable for barium base pigments and can be illustrated, for instance, as follows:

The average hiding power of a number of coalesced barium base pigments and of an average $TiO_2$ content of 25.5% was found to be 25.5.

The average hiding power of a number of blended barium base pigments and of an average $TiO_2$ content of 25.0% was found to be 32.2.

In general barium base blended pigments, according to my invention, have a hiding power greater than 25 sq. cm/g. for a 20% $TiO_2$ blend, increasing by one half sq. cm/g. in hiding power for each additional one per cent increment in $TiO_2$ content up to 35 sq. cm/g. for a 40% $TiO_2$ blend.

Color and reflectance depend to a large extent upon the purity of the components and the treatments to which they were submitted before blending. To duplicate these properties of the coalesced pigments it is necessary to employ very pure $TiO_2$ and alkaline earth metal sulfates, traces of heavy metals such for instance as iron in the alkaline earth metal sulfate greatly affect the color and reflectance of the blends. Calcined $TiO_2$ has sometimes a very slight yellowish cast (for instance 5Y—9.95/0.05 in the Munsell color scale). It is therefore preferable to use an alkaline earth metal sulfate of a reflectance even better than that of the TiO₂ with which it is to be blended. An alkaline earth metal sulfate of a reflectance of 0.975 will safely take care of any slight yellowish cast in the TiO₂.

I have found that reflectance in the blue region is of particular importance as determining the color of my blended pigments, and particularly the color of paints containing such pigments, it being necessary that the pigments have a reflectance in the blue region greater than about 0.950 for use in the highest grade white paints.

Commercial coalesced barium and calcium base pigments have a color from 13 to 15.

Colors of this range are easily duplicated by blending pigment TiO₂ with alkaline earth metal sulfates of a reflectance above about 0.94 and of a particle size such as specified in my invention.

The oil absorption of a pigment is another very important property where my novel blended pigments offer decided advantages over coalesced pigments.

For certain types of paints such as gloss enamels a low oil absorption is desired; for flat, or matte paints a high oil absorption is preferred.

It appears now that there is not much latitude in varying the oil absorption of coalesced pigments. One important factor which determines the oil absorption of pigments of this type is the temperature at which calcination is effected, at low temperature the oil absorption of an alkaline earth metal sulfate and TiO₂ is relatively high, and it decreases with increasing temperature.

In the case of coalesced pigments the calcination temperature is determined by the very high temperature (around 950° C.) required by the TiO₂ for development of its full pigment properties, and whatever oil absorption is obtained at that temperature cannot be changed greatly, except that it might be lowered by grinding as is for instance disclosed in U. S. P. No. 1,885,921 of Nov. 1, 1932. It is therefore impossible to produce coalesced pigments of high oil absorption.

I can, however, produce blended pigments of substantially any oil absorption as required for practical paint uses.

When high oil absorptions are desired, I can use uncalcined alkaline earth metal sulfates or calcine them to say 400 or 500° C. only and then blend them with the TiO₂; if low oil absorption is desired I calcine the alkaline earth metal sulfate to temperatures above 500° C., or I calcine the blended mixture of calcined TiO₂ and alkaline earth metal sulfate to the temperature at which the desired oil absorption is developed.

I found that in this procedure where a fully developed pigment TiO₂ is calcined with an alkaline earth metal sulfate no coalescence takes place at the temperatures necessary to develop sufficiently low oil absorption and in the absence of substantial amounts of fluxes. I can naturally also decrease the oil absorption of my blended pigments by grinding processes.

The greatest spread of oil absorption I have observed on finished coalesced calcium base—TiO₂ pigments ranges from about 13.9 to about 18.6. I have produced blended calcium base pigments of oil absorption as high as 38.8 down to less than 14, all in compositions of between about 20 and 40% TiO₂. In the case of coalesced barium base—TiO₂ pigments the oil absorptions in the same range of TiO₂ content run from 11.7 to 14.1, whereas I have produced blended pigments in the range from 11.7 to 16.8.

There is great practical utility in an extended titanium pigment of high oil absorption which oil absorption to my knowledge cannot be approached in a finished calcium base coalesced pigment.

It will be understood that when no specific treatments are given to reduce oil absorption of the alkaline earth metal sulfates or the blends, that the oil absorption of the resulting blends will be substantially greater than that of a coalesced pigment of similar chemical composition. Furthermore, the oil absorption of the blend will be substantially higher than that of a mechanical mixture of TiO₂ with the coarse alkaline earth metal sulfates heretofore available.

In the case of blends consisting of calcium sulfate of the particle size characteristics specified herein, mixed with pigment TiO₂ to form blends of 20 to 40% TiO₂ content, the oil absorption, when no special treatments for the reduction of oil absorption are applied, will be above 20. Similarly the corresponding barium sulfate blends possess oil absorptions of 14.8 or higher and usually above 15.

*Properties of blends affected by particle size characteristics*

The blended pigments described above have all been obtained from TiO₂ and alkaline earth metal sulfates of the properties which I found necessary for giving blends of satisfactory quality.

I shall in the following compare such pigments with pigments made outside my limits and show that such unsatisfactory pigments have hiding powers or strengths below those of the corresponding amounts of straight TiO₂, in other words, the alkaline earth metal sulfates within the limits of my invention act as re-enforcing pigments in blended pigments whereas the alkaline earth metal sulfates of a coarser particle size act merely as inert diluents in blended pigments or even decrease the pigmenting values of the straight TiO₂.

This statement applies particularly to such pigments where the TiO₂ content is from about 15 to 35% within which range there is to be found the most practical and useful pigments of this type.

Below 15% TiO₂ the strength and hiding power of the pigments are too low to warrant the use of a comparatively expensive pigment such as TiO₂. Similarly above about 35% TiO₂ the bulking value of the pigments becomes too low and the cost too high, even at the greater strength, to compete with other white pigments such as lithopone, etc. If, for example, an extended pigment of higher TiO₂ content is used in a paint, the amount required for satisfactory hiding power is not sufficient to impart the necessary body or thick consistency for good brushing and other practical application properties.

On the attached drawing Fig. 1 shows the relationship of hiding power vs. particle size of barium sulfate in barium base—TiO₂ blended pigments of my invention at various TiO₂ concentrations, the TiO₂ being in all instances of a frequency particle size average below 0.5 microns and at least 90% of said TiO₂ particles being of a particle size not greater than 1.5 microns.

The dotted line crossing diagonally the figure represents the theoretical hiding power of the TiO₂ plus that of the barium sulfate, assuming the latter to be 5 for 100% barium sulfate. It was noted that the difference in particle size of the barium sulfate within the range of products which could be used for blending with TiO$_2$ to produce paints, does not measurably affect the hiding power inherent in the barium sulfate. The hiding power of 100% TiO$_2$ as used herein was found to be 95.

It will be seen from this figure that pigments made from a good TiO$_2$ and barium sulfate in which the frequency particle size average is greater than 0.75, namely 0.78 never reach the theoretical hiding power of the straight TiO$_2$ plus that of the barium sulfate (curve A).

A blend made from a good TiO$_2$ and a barium sulfate in which the frequency particle size average is 0.86 and in which the particles greater than 1.5 microns constitute more than 10% of the particles of the barium sulfate, has properties far below those made from finer barium sulfate (curve B).

Curves I, II, and III represent pigments within the scope of my invention.

It will be seen that in the compositions such as are commercially useful the hiding power of the blends exceeds the theoretical hiding power of the corresponding TiO$_2$ plus barium sulfate.

Figure 2:
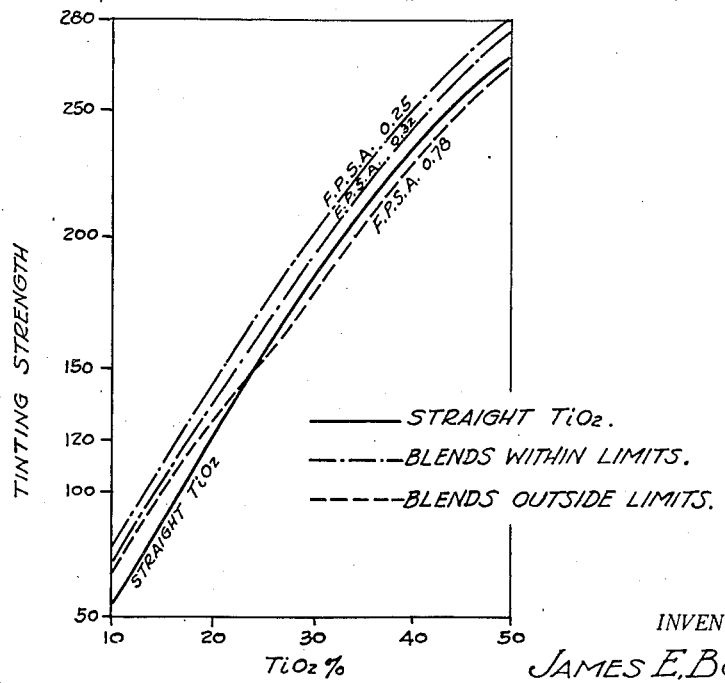

To further illustrate the above facts, I am giving in tabular form the various data relating to 25% and 17.1% TiO$_2$—BaSO$_4$ blends and corresponding amounts of unblended TiO$_2$. The table also includes specific data on corresponding coalesced pigments.

fate component upon the tinting strength of TiO$_2$—barium sulfate blends, is illustrated by the following table and Fig. 2.

It will be noted that six barium sulfate samples are used ranging in frequency particle size average from 0.25 up to 0.86 microns. Each of the six barium sulfate samples has been blended with TiO$_2$ in six different proportions so that the blends contained respectively 10, 20, 25, 30, 40, and 50% TiO$_2$. The resulting tinting strengths of the blends are tabulated below.

| Frequency particle size average of barium sulfate | tinting strength at | | | | | |
|---|---|---|---|---|---|---|
| | 10 | 20 | 25 | 30 | 40 | 50 |
| | Per Cent TiO$_2$ | | | | | |
| .25 | 78 | 148 | 169 | 198 | 248 | 288 |
| .32 | 72 | 143 | 162 | 192 | 242 | 288 |
| 0.43 | 73 | 143 | 157 | 193 | 243 | 279 |
| 0.71 | 73 | 138 | 156 | 188 | 239 | 277 |
| 0.78 | 71 | 128 | 150 | 177 | 230 | 268 |
| 0.86 | | 126 | 145 | 176 | 227 | 267 |
| Straight TiO$_2$ | 52 | 123 | 153 | 181 | 232 | *272 |

* From 25 to 50% TiO$_2$ the coarser barium sulfate reduces the inherent strength of the TiO$_2$.

From the above table one may compare the tinting strength of the same (corresponding) amount of straight TiO$_2$ (given in the last line

| No. | TiO$_2$ | | | BaSO | | | | | | Pigment | | | | | | |
|---|---|---|---|---|---|---|---|---|---|---|---|---|---|---|---|---|
| | Per Cent | Frequency particle size average microns | 90% of the particles not above microns | Frequency particle size average microns | 90% | 95% | 98% | Reflectance | | Tinting strength | Hiding power | Reflectance | | Oil absorption | Type |
| | | | | | Of the particles not above microns | | | Sunlight | Blue | | | Sunlight | Blue | | |
| 1 | 25.5 | | | | | | | | | 165 | 25.5 | 0.968 | 0.955 | 14.4 | Coalesced pigment. |
| 2 | 25.0 | 0.35 | 1.5 | 0.25 | 0.4 | 0.5 | 0.6 | 0.989 | 0.987 | 170 | 34.5 | 0.958 | 0.957 | 18.6 | Blend. |
| 3 | 25.0 | 0.35 | 1.5 | 0.32 | 0.6 | 0.7 | 0.9 | 0.991 | 0.986 | 165 | 32.8 | 0.964 | 0.964 | 15.3 | Do. |
| 4 | 25.0 | 0.35 | 1.5 | 0.43 | 1.0 | 1.1 | 1.3 | 0.996 | 0.987 | 165 | 32.0 | 0.955 | 0.953 | 15.3 | Do. |
| 5 | 25.0 | 0.35 | 1.5 | 0.71 | 1.5 | 1.9 | 2.3 | 0.987 | 0.982 | 160 | 29.6 | 0.960 | 0.962 | 14.3 | Do. |
| 6 | 25.0 | 0.35 | 1.5 | 0.78 | 1.5 | 1.7 | 2.1 | 0.989 | 0.989 | 149 | 26.1 | Not determined | | 14.0 | Do. |
| 7 | 25.0 | 0.35 | 1.5 | 0.86 | 1.9 | 2.2 | 2.7 | 0.995 | 0.994 | 147 | 23.0 | 0.958 | 0.950 | 14.0 | Do. |
| 8 | 24.6 | <0.5 | 1.5 | 3.2 | 5.3 | 5.6 | 6.4 | Not determined | | 126 | Not determined | | | 9.0 | Do. |
| 9 | 25.0 | <0.5 | 1.5 | | | | | | | 154 | 27.8 | Not determined | | | Straight TiO$_2$. |
| 10 | 17.1 | | | | | | | | | 114 | Not determined | | | 11.1 | Coalesced pigment. |
| 11 | 17.1 | <0.5 | 1.5 | 0.5 | 1.5 | Not determined | | | | 126 | 27.5 | Not determined | | 11.8 | Blend. |
| 12 | 17.1 | <0.5 | 1.5 | | | | | | | 100 | 21 | Not determined | | | Straight TiO$_2$. |

1 and 10 in this table are coalesced pigments.
9 and 12 are straight TiO$_2$ in amounts corresponding to 25 and 17.1% as indicated.
2, 3, 4, 5, and 11 are blended pigments made within the scope of my invention, and #6, 7, and 8 are blended pigments made outside my limits.
6 and 7 correspond to the curves A and B of Fig. 1 and #2, 4 and 5 correspond to curves I, II, and III of said figure.

It will be noted from the above table that the 25.5% TiO$_2$ coalesced pigment is inferior in hiding power to the blended pigments containing barium sulfate of approximately 0.75 microns frequency particle size average. In other words, blanc fixe of particle size below approximately 0.75 microns yields blends superior in hiding power to the coalesced pigments as heretofore available.

The effect of the particle size of the barium sulof the table) with the tinting strengths of the blends containing the same amount of TiO$_2$. This comparison shows that barium sulfate of 0.71 microns particle size characteristics or lower produces blends with tinting strengths above those of the straight TiO$_2$, whereas barium sulfate of particle size characteristics of 0.78 microns or greater produces blends of lower tinting strength than the straight TiO$_2$ (except for low percentages of TiO$_2$).

Selected data from the above table are plotted in Fig. 2 of the drawing which gives tinting strengths of TiO$_2$—BaSO$_4$ blends in comparison with frequency particle size averages of the barium sulfate contained in the blends and with straight TiO$_2$ at various concentrations.

The relationships: tinting strength, and hiding power vs. particle size characteristics of the $TiO_2$—calcium sulfate blended pigments are illustrated in the following table.

| Number | TiO₂ | | | CaSO₄ | | | | Pigment | | |
|---|---|---|---|---|---|---|---|---|---|---|
| | Per cent | Frequency particle size average microns | 90% of the particles not above microns | Frequency particle size average microns | 90% | 95% | 98% | Tinting strength | Hiding power | Oil absorption |
| | | | | | Of the particles not above microns | | | | | |
| 1 | 29.6 | Coalesced pigment | | | | | | 209 | 46.7 | 17.0 |
| 2 | 29.6 | 0.35 | 1.5 | 0.2 | <1.5 | | | 223 | 73.4 | 40.2 |
| 3 | 29.6 | 0.35 | 1.5 | 0.33 | 0.5 | 0.6 | 0.7 | 212 | 55.8 | 33.0 |
| 4 | 29.6 | 0.35 | 1.5 | 0.51 | 0.9 | 1.0 | 1.2 | 199 | 44.7 | 23.1 |
| 5 | 29.6 | 0.35 | 1.5 | 0.70 | 1.4 | 1.7 | 2.0 | 192 | 47.0 | 18.6 |
| 6 | 29.6 | 0.35 | 1.5 | 2.65 | Not determined | | | 144 | 44.0 | 10.6 |
| 7 | 30.4 | <0.5 | 1.5 | 0.67 | 1.5 | 1.7 | 2.0 | 207 | | 15.7 |
| 8 | 30.9 | <0.5 | 1.5 | 0.61 | 1.1 | 1.3 | 1.7 | 211 | | 15.2 |
| 9 | 30.6 | <0.5 | 1.5 | 0.52 | 1.2 | 1.8 | 2.2 | 206 | | 13.9 |
| 10 | 30.6 | <0.5 | 1.5 | 0.54 | 1.0 | 1.2 | 1.5 | 215 | | 21.7 |
| 11 | 30.0 | <0.5 | 1.5 | 0.56 | 1.3 | 2.0 | 2.3 | 208 | | 22.3 |
| 12 | 30.0 | <0.5 | 1.5 | Straight TiO₂ | | | | 193 | | |

In this table, #1 is a coalesced pigment; and #12 is straight $TiO_2$. These have been included for comparison purposes.

It will be noted that two groups of samples are included in the above table. The first group, #2–6 inclusive, represents a systematic series prepared on a small scale under the same controlled conditions except that the particle size of the calcium sulfate was intentionally varied. The second group of samples 7–11 inclusive, represents a large scale production at approximately uniform particle size characteristics ranging from 0.5 to 0.67 frequency particle size average for the calcium sulfate component.

Comparison of tinting strength with particle size characteristics of the calcium sulfate shows that the blends containing calcium sulfate of a frequency particle size average of 0.33 microns or less are substantially identical to the coalesced pigment of sample #1 and that the coalesced pigment containing calcium sulfates of frequency particle size average of about 0.7 are substantially identical in tinting strength with straight $TiO_2$. These conclusions apply to the first group of samples prepared on a small scale. The large production samples of the second group are substantially equal to the coalesced pigment in tinting strength at calcium sulfate particle size characteristics of 0.52 to 0.67 microns. These samples are also superior in strength to the straight $TiO_2$. The higher strength of the production samples compared with the laboratory samples is ascribed to the more complete incorporation and grinding possible on the larger scale operation.

In hiding power it will be noted that a calcium sulfate of frequency particle size average of 0.70 microns or less produces equality with the coalesced pigment as available previously (sample #4 is slightly out of line, possibly due to an experimental error).

From all experimental evidence available I conclude that with calcium sulfate of frequency particle size average not greater than 0.75 microns, blended pigments result which in tinting strength are superior to straight $TiO_2$ and that such blended pigments are equal to coalesced pigments of similar chemical compositions as heretofore available. On the other hand, $TiO_2$—calcium sulfate blends containing calcium sulfate of coarser particle sizes are definitely inferior in strength and hiding power to coalesced pigments as heretofore available or to straight $TiO_2$.

Description of the blending of the components

The blending of the components $TiO_2$ and alkaline earth metal sulfate of selected properties can be made in any desired manner provided a most thorough distribution of the one component throughout the mass of the other component is obtained.

While this can be effected in a dry state, it is in most instances more convenient to effect a wet blending. In most processes the $TiO_2$ and the alkaline earth metal sulfate are obtained in the form of an aqueous paste which before being available needs only drying and crushing to break up the lumps formed during drying. Such an aqueous paste is entirely suited for blending.

The aqueous paste of the pigment $TiO_2$ and the wet paste of the alkaline earth metal sulfate are then mixed with thorough agitation and the agitation preferably continued for some hours until the individual pigment particles are completely dispersed and thoroughly blended. This blended mixture is then filtered, dried and the dried cakes disintegrated.

This can then be followed by a controlled dry grinding which reduces oil absorption. This final dry grinding does not decrease the particle size of the pigment components; the reduction in oil absorption is due to some change in surface or adsorption characteristics of the pigment particles.

A specific method of blending is illustrated by the following.

A slurry of barium sulfate precipitated from barium chloride with concentrated sulfuric acid was agitated with a slurry of pigment $TiO_2$. The blended slurry was then adjusted by the addition of barium hydroxide to give it a slight alkalinity corresponding to 3 cc. of 1/50th normal sulfuric acid per 20 grams of finished pigment. The slurry was then agitated for about 24 hours, filtered, dried and the dry press cake crushed.

A convenient method of preparing a pigment $TiO_2$ of the specified characteristics is, for instance, the following.

A precipitated $TiO_2$ obtained according to Reissue Patent 18,854 or Patent 1,851,487 is washed thoroughly with water to remove free sulfuric acid, iron, and other impurities not firmly absorbed on the surface of the hydrated $TiO_2$; this washed precipitate is then treated with the requisite amount of alkali metal compound and calcined at a temperature of about 950° C. according to the process disclosed in U. S. Patent 1,892,693. The calcined pigment is wet ground. By these methods a pigment $TiO_2$ is produced which can be blended without further treatment, or the wet ground pulp can be dried, ground and then mixed with the alkaline earth metal sulfate.

Preparation of alkaline earth metal sulfates

Special procedures must be followed for the preparation of the alkaline earth metal sulfates to obtain products suitable for blending with the pigment $TiO_2$. As a matter of fact I have never found as yet a commercial calcium or barium sulfate of the particle size and other characteristics which would make them available for blending with $TiO_2$ according to my invention.

I shall describe in the following a few of the processes developed for producing satisfactory barium and calcium sulfates:

Production of barium sulfate from barium chloride and sulfuric acid

It has been known previously that sulfuric acid will precipitate barium chloride solutions to produce barium sulfate and this is old in the art of chemistry. It was, however, found that certain specific conditions must be maintained in this reaction to produce a barium sulfate of pre-determined particle size characteristics, color, and oil absorption values, etc. Particle size is influenced largely by the temperature at precipitation as well as the concentration of the precipitating solutions.

The reflectance and color are also influenced by the precipitating conditions and particularly by the purity of the solutions employed. The oil absorption runs somewhat parallel to the particle size in being influenced by concentrations and temperatures of precipitation.

By controlling the precipitating conditions one is enabled by this process to obtain barium sulfates of frequency particle size averages below 0.75 microns. Similarly, the oil absorption can be varied so that a blend of 75% $BaSO_4$ and 25% $TiO_2$ will have an oil absorption running above 15. A reflectance as high as 0.975 and not lower than 0.94 can likewise easily be obtained.

This process comprises the addition of pure sulfuric acid to purified barium chloride solutions under controlled conditions.

The barium chloride solution is first purified by rendering it alkaline to a pH of 8–9, oxidizing any iron present to the ferric condition and removing the precipitate by filtration. The preferred concentration of the barium chloride solution is 50–60 grams Ba per liter. The preferred concentration of the sulfuric acid is 60–66° Bé.

For extremely fine particles size barium sulfate, such as of a frequency particle size average of around 0.2 microns, the precipitation is conducted at a low temperature, for instance near the freezing point as obtainable by brine cooling.

At room temperature a very useful blanc fixe is obtained which is of relatively high oil absorption, which is however often desirable. From room temperature to about 65° C. the blanc fixe is of a frequency particle size average of between for instance 0.4 to 0.75 microns, and the product is eminently suited for blending with $TiO_2$ and use of the blends in outside paints.

At temperatures substantially above 65° C. and at other concentrations the precipitated barium sulfate becomes too coarse and its blends with $TiO_2$ are of lower tinting strength and hiding power.

Taking as a norm a concentration of 80–100 grams $BaSO_4$ per liter of precipitated slurry, it will be found that within reasonable limits barium sulfate of similar particle size characteristics will be formed if for each 10° C. change in the precipitation temperature the concentration is changed by about 20 grams per liter of barium sulfate precipitated; for higher concentrations the temperature must be lowered and the temperature increased for lesser concentrations.

Barium sulfates have, for instance, been produced as follows:

275 liters of barium chloride solution containing 56 grams Ba per liter was purified by adjusting the pH to 8.0 and filtering. The purified filtrate was run into a wooden tank, fitted with a wooden agitator and a rubber steam inlet. All exposed metal parts in this tank were constructed of acid-proof material. The solution was heated to 50° C. by admitting live steam during which operation the condensation of the steam caused dilution to 54 grams Ba per liter. Enough 66° Bé. sulfuric acid at 25° C. was then added over a period of 15 minutes with constant agitation to produce a slight excess of sulfuric acid. The temperature rose to 60° C. during addition of the acid.

The precipitated barium sulfate was freed from mother liquor and adhering impurities by several filtering and re-pulping operations and finally adjusted to neutrality.

When prepared in this manner the barium sulfate had a frequency particle size average between 0.5 and 0.75 microns and at least 90% of the particles were not greater than 1.5 microns.

To produce a barium sulfate of a still finer particle size the following procedure has been followed:

275 liters of a purified solution of barium chloride was cooled to 8° C. 66° Bé. sulfuric acid at 25° C. was then added simultaneously with ice whereby a temperature rise to only 10° C. was allowed. The precipitated barium sulfate was then treated as previously.

The product had a frequency particle size average of about 0.2 to 0.3 microns and at least 90% of the particles were of a particle size not greater than 1.5 microns. This product when blended with $TiO_2$ gave a somewhat higher oil absorption than the slightly coarser barium sulfate and also a somewhat better tinting strength.

The effect of higher temperature and concentration on particle size is illustrated as follows:

275 liters of barium chloride containing 90 grams Ba per liter was heated with live steam to 70° C. where the concentration was reduced to about 85 grams Ba per liter. The precipitation was made with 60° Bé. sulfuric acid at 25° C. and the temperature rose to 75° C. during the addition.

The frequency particle size average of the product was above 0.75 microns and the product produced $TiO_2$ blends of low tinting strength.

When precipitating the barium sulfate at low temperature to produce a product of very low particle size characteristics, it is found that the barium sulfate is very difficult to filter, the product tending to run through filter cloth of even the finest weave until considerable cake is formed. A very satisfactory remedy for this has been found which consists merely of adding a part of the $TiO_2$ which at a later blending stage is required, before the blanc fixe filtration step. 5 to 10% of the weight of the barium sulfate is usually sufficient to obtain this improvement in filtration, but amounts of 25% or the total amount of $TiO_2$ intended to be blended with the barium sulfate can be added without detriment, as this further improves the filterability and assures an even distribution in the final blend.

Production of barium sulfate from barium sulfide

The barium sulfates produced from barium sulfide as were available heretofore had a reflectance such that when blended with $TiO_2$ the blends had a reflectance in the blue below 0.94 and a color far below 12.

Furthermore the barium sulfide blanc fixes always retained adsorbed sulfides which are eminently deleterious for paint use, the sulfide causing darkening of paints, reactivity accompanied by thickening, etc.

The blanc fixe necessary for use in my invention must possess two difficultly achievable qualities—i. e., the correct particle size, and complete freedom from sulfur and sulfides. I have found that a new process of precipitating barium sulfate from barium sulfide solution by means of a solution of an alkali sulfate may be used. In order to obtain the correct particle size, the concentrations of the precipitants, temperatures and manner of precipitation must be controlled; in order to obtain the requisite freedom from objectionable sulfur compounds, the precipitated blanc fixe must be washed with acid solution, calcined and rewashed with acid solution. The nature of these modifications will be made clear by the following example.

A barium sulfide solution of 30° Bé. was carefully filtered to remove all off-colored suspended matter and heated to 80° C. A sodium sulfate solution of the requisite purity and containing 230 grams per liter of anhydrous sodium sulfate was heated to 35° C. The two solutions were added simultaneously to a suitable precipitating tank at such rates as always to maintain a very slight excess of soluble sulfate. Good agitation was provided. The precipitated blanc fixe was filtered and washed with water until the sulfide content was reduced to a minimum. Due to strong adsorption of sulfide complete removal by washing is impossible. The washed cake was then repulped in water to produce a slurry containing 33% solids. To this slurry was added sufficient sulfuric acid to give, after thorough agitation, a pH of about 2.0.

The treated precipitate was then washed with water by settling and decantation, until the supernatant liquid had a pH of 3.0 to 4.0. The slurry was finally adjusted to neutrality (7.0 to 8.0 pH) by addition of dilute alkali, filtered, and the filter cake dried and calcined at about 500° C. in an oxidizing atmosphere.

The calcined product was quenched in water, and the water slurry, which contains 33% solids, was given a second acid treatment identical with that applied before the calcination. The acid treated product was washed by decantation until the supernatant liquor had a pH of 4.0 to 5.0. The slurry was finally adjusted to neutrality with dilute alkali.

The blanc fixe produced according to the above description possesses a frequency particle size average below 0.75 microns with at least 90% of the particles below 1.5 microns, is especially good in color with a reflectance above 0.94, and possesses desirable high oil absorption properties. It is also free from sulfides. When blended with pigment $TiO_2$, the blends possess hiding powers and tinting strengths equal to or better than those of the coalesced pigments of similar chemical composition, oil absorptions higher than those of the coalesced pigments, and reflectances above about 0.95.

*Preparation of calcium sulfate*

The preferred calcium sulfate for use in my invention is the so-called insoluble anhydrite form, although other forms such as gypsum can be used if complying with the specific requirements for particle size, reflectance, etc.

A process whereby I produce a calcium sulfate of the particle size and other pigmenting characteristics suitable for blending with $TiO_2$ according to my invention was operated, for instance, as follows:

Slacked lime containing 150 grams CaO per liter was gradually added to 60° Bé. sulfuric acid until about 85% of the acid was neutralized. The amount of sulfuric acid used was sufficient to produce 1400 lbs. of precipitated calcium sulfate.

The temperature rose rapidly during the precipitation to approximately 113° C. and gradually decreased. The temperature was held closely to boiling during the operation and the reaction mass was maintained at that temperature with continued thorough agitation until such time as very few acicular crystals remained in the slurry as could be observed under the microscope at 400 magnification. This slurry of anhydrite was then filtered and washed until the filtrate showed a pH of at least 4. The filter cake as removed from the press was repulped in fresh water and made alkaline with a small amount of sodium hydroxide. The anhydrite slurry so obtained was then filter pressed and ready for blending with $TiO_2$ or can be calcined before such blending. The slight trace of sodium hydroxide remaining with the calcium sulfate reduces the oil absorption of the product on calcination. The same effect can be obtained, even to a greater extent, if any alkali metal compound is added to the calcium sulfate before calcination.

A product of excellent color and a frequency particle size average of about 0.5 microns with at least 90% of the particles being not greater than 1.5 microns was thus obtained.

In the above example I have described a method for the production of calcium sulfate possessing the specified pigmenting properties discussed above. It will be understood that I may prefer in some cases to calcine this calcium sulfate for the purpose of stabilizing it against rehydration when brought into contact with water. This calcination does not change the particle size, reflectance and other essential pigmenting characteristics. I may, for example, calcine the calcium sulfate separately and then blend or mechanically mix with the $TiO_2$ component of the specified pigmenting properties, or for the sake of simplicity and ease of large scale operations I may prefer to blend or mechanically mix the two components prior to calcination of the calcium sulfate. In case the blend is subsequently calcined, the calcination temperature is maintained below that temperature at which there may be any tendency toward cementing together or coalescing the two components.

I cite below two examples of pre-calcination of the calcium sulfate together with the properties of the blended pigment produced from such calcined calcium sulfate.

The calcium sulfate was calcined to about 800° C. and blended with a good $TiO_2$. It produced a pigment with the following characteristics:

|  | Percent |
| --- | --- |
| $TiO_2$ content | 30.6 |
| Strength | 208 |
| Color | 15 |
| Oil absorption | 18.6 |

A product precipitated as above was calcined at 700° C. and dry ground.

Blended with a good $TiO_2$ it produced a blended pigment of the following characteristics:

|  | Percent |
| --- | --- |
| $TiO_2$ content | 30.7 |
| Strength | 213 |
| Color | 14+ |
| Oil absorption | 25.3 |

The above examples refer to the preparation of calcium sulfate in the form of insoluble anhydrite. This is my preferred form of calcium sulfate due to the ease with which it can be produced within the specified limits of pigmenting properties, namely frequency particle size average, reflectance, etc. It will be understood, however, that I do not limit myself to the insoluble anhydrite modification of calcium sulfate and that other forms of calcium sulfate are equally applicable in the preparation of blended pigments of high quality. For example, gypsum is useful if produced within the specified range of pigmenting properties and subsequently blended with the $TiO_2$ component.

In the above I have described and discussed pigments in which only one alkaline earth metal sulfate has been blended with the $TiO_2$. It is of course understood, that I can add more than one alkaline earth metal sulfate to the $TiO_2$. This permits of a still greater variation in the properties of the blends, particularly in the oil absorption, as the oil absorption of calcium sulfate blends when no special treatments are resorted to is generally higher than that of the corresponding barium sulfate blends. Such multi-component blends can be produced in any desired way.

It is further to be understood that my blended pigments can be utilized in the same way as other white pigments. For example, they may be used separately in the preparation of paints and other pigmented compositions, or they may be mixed with other components such as natural low grade extenders or cheap precipitated extenders for the sake of economy, or with other components to produce specific properties which may be desired. This further mixing normally occurs in the pigmented composition, but pre-mixing may be resorted to if desired for any reason.

It is in most instances preferred to avail oneself of the advantages of the novel blended pigments of my invention by producing them in a finished dry form.

It is, however, also possible to effect the blending of the pigment $TiO_2$ and the dry alkaline earth metal sulfate directly in the presence of a vehicle whereby paints or other pigmented compositions may be produced with all the characteristics of strength, oil absorption, hiding power, etc. which could be produced by blending the $TiO_2$ and the alkaline earth metal sulfate in the dry or aqueous state and then incorporating the blend into the paint vehicle.

Another possibility which is contemplated within the scope of my invention is to first separately mix the $TiO_2$ and the barium sulfate with parts of the paint vehicle and then mix such oil pastes to form the finished blended paint.

I claim:

1. A pigment comprising a mechanical blend of pigment $TiO_2$ and an alkaline earth metal sulfate, substantially all of said $TiO_2$ and alkaline earth metal sulfate conforming to the following requirements: the frequency particle size average of the $TiO_2$ is not more than 0.50 microns and the frequency particle size average of the alkaline earth metal sulfate is not more than 0.75 microns and 90% of said particles of $TiO_2$ and alkaline earth metal sulfate are not greater than 1.5 microns in size, said blend being at least substantially equal in reflectance and tinting strength to a coalesced pigment of a similar composition and said blend consisting of from 15–50% $TiO_2$ and the balance alkaline metal earth sulfate.

2. The pigment of claim 1 in which the alkaline earth metal sulfate is calcium sulfate and the blend having an oil absorption substantially greater than that of a coalesced pigment of a similar composition.

3. A pigment comprising a mechanical blend of pigment $TiO_2$ and an alkaline earth metal sulfate, the $TiO_2$ in said blend having a frequency particle size average of not more than 0.50 microns, the alkaline earth metal sulfate in said blend having a frequency particle size average of not more than 0.75 microns, and 90% of the particles of said $TiO_2$ and alkaline earth metal sulfate being not greater than 1.5 microns in size, said blend containing from 20 to 40% $TiO_2$ and having a hiding power substantially greater than 25 sq. cm./gm for a 20% $TiO_2$ blend, increasing by ½ sq. cm./gm in hiding power for each additional 1% increment in $TiO_2$ content up to 35 sq. cm./gm for a 40% $TiO_2$ blend.

4. The product of claim 1 in which the alkaline earth metal sulfate is calcium sulfate.

5. The product of claim 3 in which the alkaline earth metal sulfate is calcium sulfate.

JAMES E. BOOGE.